United States Patent
DeRocher et al.

(10) Patent No.: US 10,968,342 B2
(45) Date of Patent: *Apr. 6, 2021

(54) PROCESS FOR PREPARING AN AQUEOUS DISPERSION OF MULTISTAGE POLYMER PARTICLES

(71) Applicant: Rohm and Haas Company, Collegeville, PA (US)

(72) Inventors: Jonathan DeRocher, Coopersburg, PA (US); Andrew Hejl, Lansdale, PA (US); Jessica Levin, Philadelphia, PA (US); John J. Rabasco, Collegeville, PA (US); Antony K. Van Dyk, Blue Bell, PA (US); Kimy Yeung, Phoenixville, PA (US)

(73) Assignee: Rohm and Haas Company, Collegeville, PA (US)

( * ) Notice: Subject to any disclaimer, the term of this patent is extended or adjusted under 35 U.S.C. 154(b) by 36 days.

This patent is subject to a terminal disclaimer.

(21) Appl. No.: 16/511,069

(22) Filed: Jul. 15, 2019

(65) Prior Publication Data

US 2020/0024440 A1 Jan. 23, 2020

Related U.S. Application Data

(60) Provisional application No. 62/700,542, filed on Jul. 19, 2018.

(51) Int. Cl.

| | |
|---|---|
| *C08L 33/12* | (2006.01) |
| *C08F 212/08* | (2006.01) |
| *C08F 285/00* | (2006.01) |
| *C09D 7/65* | (2018.01) |
| *C09D 5/14* | (2006.01) |

(52) U.S. Cl.
CPC ............... *C08L 33/12* (2013.01); *C09D 5/14* (2013.01); *C09D 7/65* (2018.01); *C08L 2201/50* (2013.01); *C08L 2207/53* (2013.01)

(58) Field of Classification Search
CPC ........ C08F 2/24; C08F 265/04; C08F 285/00; C08F 265/06; C08F 212/14; C08F 220/1804; C08F 212/103; C08F 212/08; C08F 2/44; C08F 222/102; C08L 33/12; C08L 2201/50; C08L 2207/53; C08L 71/00; C08L 51/003; C08L 33/08; C09D 7/65; C09D 5/14; C09D 4/06; C09D 133/10; C09D 7/70; C09D 133/02; C09D 7/43; C09D 5/024; C09D 151/003; C09J 151/003; C08J 3/126; C08G 65/2609
USPC ........................................................ 523/210
See application file for complete search history.

(56) References Cited

U.S. PATENT DOCUMENTS

| | | | |
|---|---|---|---|
| 4,427,836 A | 1/1984 | Kowalski et al. | |
| 4,468,498 A | 8/1984 | Kowalski et al. | |
| 5,510,422 A | 4/1996 | Blankenship et al. | |
| 5,527,613 A | 6/1996 | Blankenship et al. | |
| 10,005,871 B2* | 6/2018 | Perez | C09D 7/61 |
| 10,487,166 B2* | 11/2019 | Yang | C08F 265/06 |
| 2003/0232914 A1* | 12/2003 | Devonport | C09B 67/0005 524/501 |
| 2020/0024458 A1* | 1/2020 | DeRocher | C09D 7/70 |
| 2020/0071439 A1* | 3/2020 | Bardman | C08F 20/56 |
| 2020/0071558 A1* | 3/2020 | Bardman | C09D 7/70 |
| 2020/0102412 A1* | 4/2020 | Bardman | C09D 151/003 |

OTHER PUBLICATIONS

"Aqueous Dispersion of Multistage Polymer Particles" by Jonathan Derocher et al. United States Provisional patent application filed Jul. 19, 2018, U.S. Appl. No. 62/700,545.

* cited by examiner

*Primary Examiner* — Hannah J Pak
(74) *Attorney, Agent, or Firm* — Reid S. Willis

(57) ABSTRACT

The present invention relates to a process for preparing an aqueous dispersion of neutralized multistage polymer particles comprising the steps of contacting under emulsion polymerization conditions a) an aqueous dispersion of first polymer particles with b) first monomers to form an aqueous dispersion of 2-stage polymer particles; then contacting under emulsion polymerization conditions the aqueous dispersion of 2-stage polymer particles with second monomers comprising to form an unneutralized aqueous dispersion of 3-stage polymer particles; then neutralizing the unneutralized aqueous dispersion of 3-stage polymer particles with a base to form an aqueous dispersion of neutralized 3-stage polymer particles, wherein the first and second monomers form a shell having a calculated $T_g$ of less than 50° C. The process of the present invention is useful in preparing a composition that is useful as an open time additive in coatings formulations.

9 Claims, No Drawings

PROCESS FOR PREPARING AN AQUEOUS DISPERSION OF MULTISTAGE POLYMER PARTICLES

BACKGROUND OF THE INVENTION

The present invention relates to an aqueous dispersion of multistage alkali swellable polymer particles. The dispersion of alkali swellable polymer particles is useful as an open time additive in coatings formulations.

Government regulations and market movement continually drive toward zero volatile organic compounds (VOC) for coating formulations. Consequently, waterborne formulations that are free of volatile solvents and coalescents have become increasingly popular in the industry. Nevertheless, paint properties have been compromised due to this sea change; among them is open time, which is the period of time during which a freshly applied paint film can be reworked without leaving brush marks. In a solvent-borne system, open time is about 30 to 45 min; in a typical waterborne formulation, open time is on the order of 3 to 5 min. Accordingly, there is a need in the art to find an additive for waterborne formulations that increases open time over currently available additives without degrading other properties of the final coating, such as film adhesive and cohesive strength, hardness, block resistance, early blister resistance, scrub and wash resistance, stain resistance, and mar resistance.

SUMMARY OF THE INVENTION

The present invention addresses a need in the art by providing a process for preparing an aqueous dispersion of neutralized multistage polymer particles comprising the steps of:

1) contacting under emulsion polymerization conditions a) an aqueous dispersion of first polymer particles comprising from 25 to 65 weight percent structural units of a carboxylic acid monomer, and from 40 to 75 weight percent structural units of a nonionic monomer with b) first monomers comprising, based on the weight of the first monomers, i) from 80 to 99.5 weight percent styrene or methyl methacrylate or a combination thereof, and ii) from 0.5 to 20 weight percent of a carboxylic acid monomer; to form an aqueous dispersion of 2-stage polymer particles; then 2) contacting under emulsion polymerization conditions the aqueous dispersion of the 2-stage polymer particles with second monomers comprising, based on the weight of the second monomers a) from 1 to 60 weight percent methyl methacrylate, b) from 35 to 98.5 weight percent n-butyl acrylate, 2-ethylhexyl acrylate, ethyl acrylate, or n-butyl methacrylate, or a combination thereof; c) from 0.5 to 5 weight percent of a carboxylic acid monomer; and d) less than 20 weight percent styrene, to convert the 2-stage polymer particles to unneutralized 3-stage polymer particles; then 3) neutralizing the unneutralized aqueous dispersion of the 3-stage polymer particles with a base to form an aqueous dispersion of neutralized 3-stage polymer particles having an average particle size in the range of 150 nm to 400 nm; wherein the weight-to-weight ratio of the first polymer particles to the first and second monomers is in the range of from 1:2 to 1:9; and the weight-to-weight ratio of the first monomers to second monomers is in the range of from 3:2 to 1:8; wherein the first and second monomers form a shell having a calculated $T_g$ of less than 50° C.

The process of the present invention is useful in preparing a composition that is useful as an open time additive in coatings formulations.

DETAILED DESCRIPTION OF THE INVENTION

The present invention is a process for preparing an aqueous dispersion of neutralized multistage polymer particles comprising the steps of:

1) contacting under emulsion polymerization conditions a) an aqueous dispersion of first polymer particles comprising from 25 to 65 weight percent structural units of a carboxylic acid monomer, from 40 to 75 weight percent structural units of a nonionic monomer with b) first monomers comprising, based on the weight of the first monomers, i) from 80 to 99.5 weight percent styrene or methyl methacrylate or a combination thereof, and ii) from 0.5 to 20 weight percent of a carboxylic acid monomer; to form an aqueous dispersion of 2-stage polymer particles; then 2) contacting under emulsion polymerization conditions the aqueous dispersion of the 2-stage polymer particles with second monomers comprising, based on the weight of the second monomers a) from 1 to 60 weight percent methyl methacrylate, b) from 35 to 98.5 weight percent n-butyl acrylate, 2-ethylhexyl acrylate, ethyl acrylate, or n-butyl methacrylate, or a combination thereof; c) from 0.5 to 5 weight percent of a carboxylic acid monomer; and d) less than 20 weight percent styrene, to convert the 2-stage polymer particles to unneutralized 3-stage polymer particles; then 3) neutralizing the unneutralized aqueous dispersion of 3-stage polymer particles with a base to form an aqueous dispersion of neutralized 3-stage polymer particles having an average particle size in the range of 150 nm to 400 nm; wherein the weight-to-weight ratio of the first polymer particles to the first and second monomers is in the range of from 1:2 to 1:9; and the weight-to-weight ratio of the first monomers to second monomers is in the range of from 3:2 to 1:8; wherein the first and second monomers form a shell having a calculated $T_g$ of less than 50° C.

As used herein, 2-stage polymer particles are polymer particles prepared in at least two stages; similarly 3-stage polymer particles are prepared in at least three stages, with the proviso that the 3-stage polymer particles require at least one more stage than the 2-stage polymer particles. The multistage polymer particles prepared by the process of the present invention preferably have a core-shell morphology wherein the first polymer particles (first phase) form the core and the polymerized first and second monomers (second phase) form the shell. The dispersion of first polymer particles may be produced by a single stage or a multistage process, preferably in the presence of a chain transfer agent such as n-dodecyl mercaptan or mercaptoethanol. The dispersion of first polymer particles may also be prepared from a seed process.

Preferably, the first phase comprises from 30, more preferably from 35, and most preferably from 38 weight percent, to preferably 50, more preferably to 45, and most preferably to 42 weight percent structural units of a carboxylic acid monomer, based on the weight of the first phase. As used herein, the term "structural units" refers to the remnant of the recited monomer after polymerization. For example, a structural unit of methacrylic acid is as illustrated:

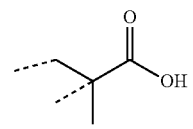

structural unit of methacrylic acid

The first phase also preferably comprises from 50, more preferably from 55, and most preferably from 58 weight percent, to preferably 70, more preferably to 65, and most preferably to 62 weight percent structural units of a nonionic ethylenically unsaturated monomer.

Examples of carboxylic acid functionalized monomers include methacrylic acid, acrylic acid, and itaconic acid, with acrylic acid and methacrylic acid being preferred. Examples of nonionic ethylenically unsaturated monomers include $C_1$-$C_{10}$ alkyl acrylates and methacrylates such as methyl methacrylate, ethyl acrylate, ethyl methacrylate, butyl acrylate, butyl methacrylate, and 2-ethylhexyl acrylate; and styrene. Methyl methacrylate and butyl methacrylate are preferred nonionic ethylenically unsaturated monomers.

The first phase preferably comprises less than 0.04 weight percent, more preferably less than 0.01 weight percent structural units of a multiethylenically unsaturated monomer such as ethylene glycol dimethacrylate, ethylene glycol diacrylate allyl methacrylate, allyl acrylate, 1,3-butane-diol dimethacrylate, 1,3-butane-diol diacrylate, diethylene glycol dimethacrylate, diethylene glycol diacrylate, trimethylol propane trimethacrylate, or divinyl benzene.

The average particle size of the first phase is preferably in the range of from 80 nm to 150 nm as measured by light scattering using a BI-90 Plus Brookhaven Particle Analyzer.

The first monomers comprise from 80 to 99.5 weight percent styrene or methyl methacrylate or a combination thereof, and from 0.5 to 20 weight percent of a carboxylic acid monomer, preferably methacrylic acid or acrylic acid. In one embodiment of the present invention the first monomers comprises from 80 to 99.5 weight percent structural units of styrene. The $T_g$ of the polymer formed by the first monomers as calculated by the Fox equation is preferably greater than 90° C., more preferably greater than 100° C.

The second monomers preferably comprise, based on the weight of the second monomers, from 35 to 60, more preferably to 50 weight percent methyl methacrylate; less than 20, more preferably less than 10, and most preferably less than 5 weight percent styrene; and from 40, more preferably from 50, to 65, more preferably to 60 weight percent n-butyl acrylate, 2-ethylhexyl acrylate, ethyl acrylate, or n-butyl methacrylate, or a combination thereof.

The second monomer may further comprise a sulfur acid containing monomer or a salt thereof, such as sodium styrene sulfonate, at a concentration in the range of from 0.1 to 0.5 weight percent, based on the weight of the second polymer. The calculated $T_g$ of the polymer formed by the second monomers is preferably less than 25° C., more preferably less than 20° C.

The shell formed by the polymerization of the first and second monomers has a $T_g$ as calculated by the Fox equation of less than 50° C., preferably less than 40° C. As used herein calculated $T_g$ of the shell refers to the weighted average calculated $T_g$ of the polymers in the shell, preferably of the polymers formed from the polymerization of the first and second monomers.

Preferably, the total amount of styrene in the first and second monomers does not exceed 20 weight percent, based on the weight of the first and second monomers. The first and second monomers preferably comprise less than 0.4 weight percent and more preferably less than 0.2 weight percent of a multiethylenically unsaturated monomer, based on weight of the first and second monomers. The average particle size of the neutralized 3-stage polymer particles as measured by light scattering using a BI-90 Plus Brookhaven Particle Analyzer is in the range of from 150 nm, more preferably from 200 nm, to 400 nm, more preferably to 350 nm, most preferably to 320 nm. The solids content of the aqueous dispersion of neutralized 3-stage polymer particles is preferably in the range of from 10 to 30 weight percent.

The multistage polymer particles are prepared in multiple stages, preferably in three stages. In a preferred method of preparing the dispersion of neutralized second multistage polymer particles, methacrylic acid (~40 parts by weight) and methyl methacrylate (~60 parts by weight) are copolymerized under emulsion polymerization in a kettle to form a dispersion of polymer particles preferably with an average particle size in the range of from 100 nm to 150 nm. An aqueous emulsion of methacrylic acid (10 to 15 parts by weight) and styrene (85 to 90 parts by weight) is added to the heated kettle (~75 to 80° C.) over a 15- to 30-minute period and under emulsion polymerization conditions, after which time the kettle temperature is increased to a temperature in the range of from 85° C. to 95° C. After the completion of addition of the methacrylic acid and styrene, and during the ramping of the temperature, an aqueous emulsion of butyl acrylate, methyl methacrylate, and sodium styrene sulfonate are added to the kettle over time and under emulsion polymerization conditions at a temperature maintained in the range of from 85° C. to 95° C. Residual monomer is then chased and the dispersion is neutralized to a pH in the range of 7 to 9 with a suitable base such as alkali metal hydroxides, ammonia, amines, and alkanol amines such as 2-amino-2-methyl-1-propanol; the consequent dispersion of multistage polymer particles is conveniently filtered to remove coagulum.

The aqueous dispersion of multistage polymer particles is useful as an open time additive in a coatings composition, which includes a binder and a rheology modifier, and one or more of the following materials: dispersants, pigments, defoamers, surfactants, solvents, extenders, coalescents, biocides, opaque polymers, and colorants. The dispersion of multistage polymer particles can be used alone as an open time additive, or in combination with one or more ancillary additives. Accordingly, in another aspect of the present invention, an ancillary additive is contacted with the aqueous dispersion of neutralized second multistage polymer particles.

One such ancillary additive is a phenyl glycidyl ether represented by the following structure I:

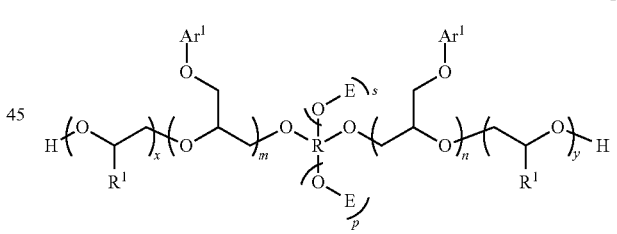

where the fragment

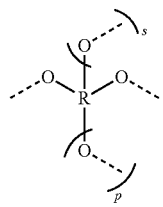

is a structural unit of a $C_2$-$C_{60}$ linear or a $C_3$-$C_{60}$ branched or cyclic diol, triol, or tetrol optionally functionalized with O atoms or aryl groups or both, or a structural unit of an unsubstituted aromatic diol, triol, or tetrol, or a structural unit of an aromatic diol, triol, or tetrol substituted with from 1 to 3 $C_1$-$C_6$ alkyl groups;

each $R^1$ is independently H or $C_1$-$C_6$ alkyl;

E is represented by the following structure:

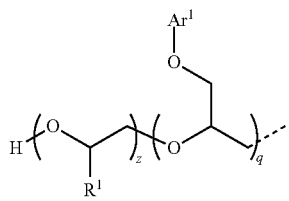

where m, n, and q are each independently from 1 to 20; x, y, and z are each independently from 1 to 50; p is 0 or 1; s is 0 or 1; and each $Ar^1$ is independently unsubstituted phenyl or naphthyl, or phenyl or naphthyl substituted with from 1 to 3 $C_1$-$C_6$ alkyl groups.

Examples of suitable diols useful for preparing the phenyl glycidyl ether of structure I include $C_2$-$C_{20}$ alkane diols such as 1,2-ethane diol, 1,3-propane diol, 1,4-butane diol, and 1,6-hexane diol, as well as alkoxylated derivatives of these diols; polyoxyalkylene diols of the type H—($OCH_2$ $CH(R^2))_b$—OH, where b is from 2 to 30, preferably 2, 3, or 4; and more preferably 3; and $R^2$ is H, methyl, or ethyl; aromatic diols such as 1,4-benzenedimethanol, catechol, resorcinol, and hydroquinone, as well as alkoxylated derivatives of these diols.

Example of suitable triols include trimethylolpropane, phloroglucinol, hydroxyquinol, pyrogallol, and glycerol, as well as alkoxylated derivatives of these triols; examples of suitable tetrols are pentaerythritol and benzenetetrol and alkoxylated derivatives of these tetrols.

Each $Ar^1$ is preferably independently phenyl, cresyl, or p-t-butylphenyl; preferably, m and n are each independently in the range of from 1, more preferably from 2, to 10, more preferably to 6, and most preferably to 5. Preferably, x and y are each independently from 5, more preferably from 10, to 30, more preferably to 25. Preferably, p and s are both 0.

Because each $R^1$ is independently H or $C_1$-$C_6$-alkyl, the alkylene oxide groups (($OCH_2CHR^1)_n$) can be random or block copolymers. Preferably, each $R^1$ is independently H, methyl, or ethyl; more preferably H or methyl; most preferably each $R^1$ is H.

Examples of subclasses of the phenyl glycidyl ether of structure I are represented by the following structures:

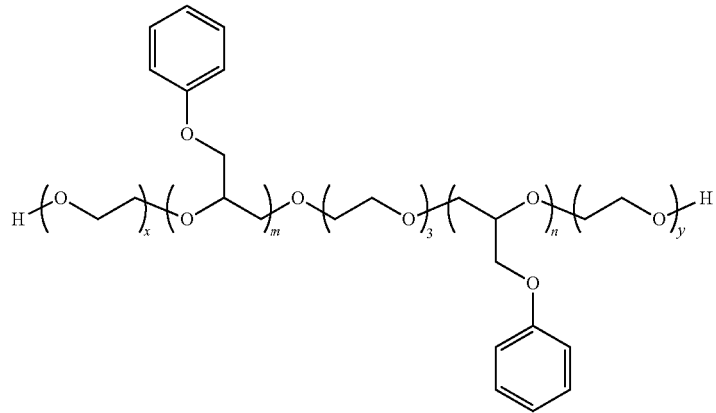

1a

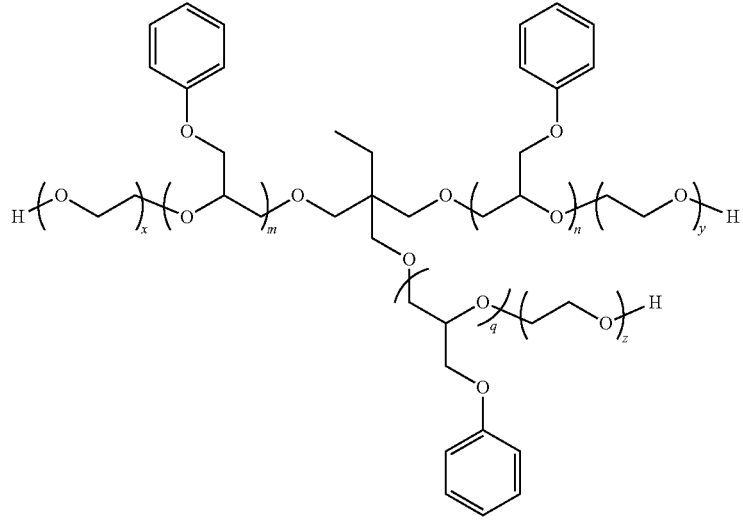

1b

For 1a, m+n is more preferably in the range of 2 to 8, more preferably to 6; and x+y is preferably in the range of 25, more preferably from 30 to 50, more preferably to 45.

For 1b, m+n+q is preferably in the range of from 4 to 8; and x+y+z is preferably in the range of from 30, more preferably from 35, to 50, more preferably to 45.

Another class of suitable ancillary open time additives is a phenyl glycidyl ether represented by the structure II:

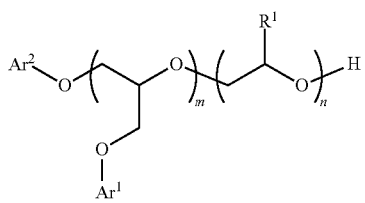

where $Ar^1$, $Ar^2$, and $R^1$ are as previously described; and m is from 1, preferably from 2, to 20, preferably to 10, and more preferably to 6; and n is from 1, preferably from 5, to 100, more preferably to 60.

Other classes of suitable ancillary open time additives are secondary alcohol ethoxylates, commercial examples of which include TERGITOL™ Alcohol Ethoxylates; ethoxylated sorbitan esters, a commercial example of which is Ethsorbox O-20 Ethoxylated Sorbitan ester; polyoxyethylene alkyl and alkyl ether phosphates such as polyoxyethylene decyl ether phosphate (commercially available as Ethfac PD-6 surfactant) and polyoxyethylene tridecyl phosphate (commercially available as Ethfac 163/363 surfactant); alkyne ethoxylates such as ethoxylated 2,4,7,9-tetramethyl-5-decyn-4,7-diol (commercially available as Surfynol 485 alkyne ethoxylate); and EO/PO polyol block copolymers (commercially available as DOWFAX™ 63N40 Block Copolymer, A Trademark of The Dow Chemical Company or its Affiliates).

A mixture of the aqueous dispersion of neutralized multistage polymer particles and the ancillary additive can be combined with the pigment, rheology modifier and any or all of the components used to make a coating formulation. The concentration of the multistage polymer particles (dry weight) in the coating formulation is preferably in the range of from 0.5 to 5 weight percent based on the weight of the coating formulation. The concentration of the ancillary additive is preferably in the range of from 0.1, more preferably from 0.3 weight percent, to 1, more preferably 0.8 weight percent, based on the weight of the coating formulation. Preferably, the ancillary additive is used at a concentration of less than 50%, more preferably less than 25%, and most preferably less than 20% of the dry weight of the multistage polymer particles.

EXAMPLES

Open time was measured in accordance with ASTM-D7488. The test was performed in a constant temperature/humidity room (72° F., 50% RH). Paint was deposited on a black vinyl scrub chart using a drawdown bar with a 5-mil gap. The film was immediately scored by making parallel marks in the wet paint using two wooden applicators. Sections of the film were then brushed at timed intervals using a primed 1" nylon brush. The film was allowed to dry overnight. A panel of at least three readers visually inspected the panel and recorded the last cross brush section that showed no sign of the score marks as the open time.

Intermediate Example 1—Preparation of Phenyl Glycidyl Ether Ethoxylate Block Copolymer A 500-mL round-bottom flask equipped with a temperature controlled heating mantle, an addition funnel, a reflux/distillation head, and overhead stirrer was charged with triethyleneglycol (61.13 g, 0.407 mole) and KOH flakes (1.18 g, 90% pure). Phenyl glycidyl ether (247.47 g, 1.65 moles) was added over 5 h at 100° C., after which time the mixture was cooled to room temperature. A portion of the resultant intermediate (86.7 g) was charged into a conical bottom 2-L Parr reactor. The reactor was sealed, pressure checked, purged with $N_2$, then heated to 120° C. Ethylene oxide (151.0 g) was added at a rate of 0.2 to 0.3 g/min. The mixture was held at 120° C. for 1 h, then cooled to 60° C. before unloading the product (652.7 g). The reaction product was mixed with 0.18 g of acetic acid to achieve a product having the structure:

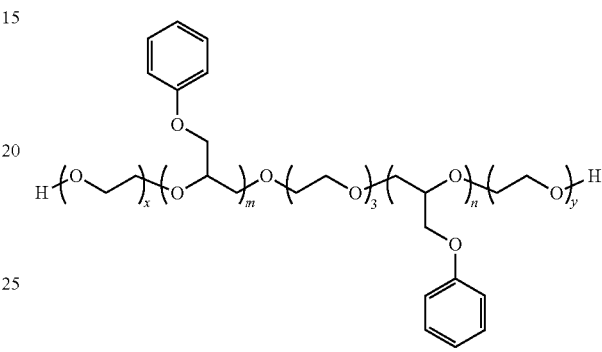

where m+n=4; and x+y=30.

Example 1—Preparation of a Dispersion of Multistage Polymer Particles

A. Preparation of $1^{st}$ Stage Core (60 MMA/40 MAA)

Deionized (DI) water (1760 g) was added to a 5-L, four-necked round bottom kettle equipped with a paddle stirrer, thermometer, $N_2$ inlet, and reflux condenser. The kettle was heated to 85° C. under $N_2$. A first monomer emulsion (ME1) was prepared by mixing DI water (720 g), Disponil FES-993 surfactant (29%, 5.38 g), methyl methacrylate (783.92 g), and methacrylic acid (10.1 g). A portion of ME1 (164.0 g) was removed and placed aside in a separate container. Disponil FES-993 surfactant (29%, 56.48 g), methyl methacrylate (78.4 g), and methacrylic acid (567.6 g) were added to the remaining MEL When the kettle temperature reached 85° C., a solution of Actrene antifoulant (5% solution, 0.6 g) diluted with DI water (5 g) and a solution of DI water (160 g) and Disponil FES-993 surfactant (29%, 3.3 g) were added to the kettle, followed by the addition of the ME1 (164 g) initially removed and set aside. A solution of sodium persulfate (98%, 5.5 g) in DI water (40 g) was then added to the kettle. The temperature of the kettle dropped to ~76° C. and then was allowed to rise to 85° C. during a 15-min hold period. The remaining ME1 was then fed to the kettle over 2 h at 85° C. After completion of the ME1 feed, the reaction mixture was held at 85° C. for 15 min, whereupon the mixture was cooled to room temperature and filtered to remove any coagulum. The filtered product had a pH of 2.76, a solids content of 33.5%, and an average particle size of 132 nm as measured using a BI-90 Plus Brookhaven Particle Analyzer.

B. Preparation of a Dispersion of Alkali Swellable Polymer Particles with a 1:1:5 Core-tie-coat-Shell w/w/w Ratio and 40% Methacrylic Acid in the Core DI water (780 g) and glacial acetic acid (98%, 0.325 g) were added to a 5-L, four-necked round bottom flask (kettle) equipped with a paddle stirrer, thermometer, $N_2$ inlet, and reflux condenser. The kettle was heated to 90° C. under $N_2$. A second monomer emulsion (ME2) was prepared by mixing DI water (71.5 g), sodium dodecyl benzene sulfonate (SDS, 22.3%, 1.16 g), styrene (87.23 g), and methacrylic acid (13.13 g). A third monomer emulsion (ME3) was prepared by mixing DI water (126.1 g), SDS (22.3%, 6.02 g), linseed oil fatty acid (LOFA, 99.5%, 0.92 g), butyl acrylate (265.45 g), methyl methacrylate (199.97 g), and sodium styrene sulfonate (SSS, 90%, 2.59 g). When the kettle temperature reached 90° C., a solution of sodium persulfate (98%, 2.76 g) in DI water (9.75 g) was added to the kettle, followed by the dispersion of part A (278.07 g). The temperature of the kettle dropped to ~73° C. and was allowed to rise to 77° C. At 77° C., ME2 was fed to the kettle over 25 min with the temperature set to 81° C. After completion of the ME2 feed, the temperature was ramped to 92° C. During the ramping period (at 82° C.), ME3 was added at a rate of 10.4 g/min over 11 min. A solution of sodium persulfate (0.898 g) in DI water (97.5 g) was co-fed at a rate of 1.46 g/min over 11 min. After 11 min, the ME3 feed rate was increased to 15.73 g/min and the co-feed catalyst feed rate was increased to 2.76 g/min over 31 min. The temperature of the kettle was maintained at 92° C. throughout the addition of ME3. After completion of the additions of the ME3 and co-feed catalyst, a solution of iron sulfate heptahydrate (0.15% solution, 21.63 g) and VERSENE™ Chelating Agent (1.0% solution, 3.25 g, a Trademark of The Dow Chemical Company or its Affiliates) was added to the kettle and the reaction mixture was held at 92° C. for 15 min. The temperature was adjusted to 85° C. and the mixture held at this temperature for 5 min. After the 5 min hold, a solution of t-butyl hydroperoxide (70% solution, 4.55 g) in DI water (6.63 g) was added to the kettle, followed by the addition of a solution of isoascorbic acid (98%, 2.82 g) in DI water (54.2 g) over 21 min. After the completion of addition of the isoascorbic acid solution, the reaction mixture was held at 85° C. for 15 min. The reaction mixture was cooled to 50° C., whereupon warm DI water (50° C., 851 g) was added to the kettle. A solution of sodium hydroxide (50% w/w, 35.62 g) in DI water (760.63 g) was fed to the kettle at 50° C. over 30 min. The reaction mixture was then held at 50° C. for 15 min then cooled to 30° C. At 40° C., a solution of KATHON™ LX Microbicide (1.5%, 13.31 g, a Trademark of The Dow Chemical Company or its Affiliates) in DI water (188.97 g) was fed to the kettle over 50 min. The contents of the kettle were then cooled to room temperature and filtered to remove any coagulum. The filtered product was found to have a pH of 7.34, a solids content of 16.7%, and an average particle size of 322 nm as measured using a BI-90 Plus Brookhaven Particle Analyzer.

Paint Formulations

Three paint formulations were prepared: Comparative Paint 1, which contains no open time additive; Paint 1, which contains both open time additives described in Example 1 and Intermediate Example 1; Paint 2, which contains the open time additive described in Example 1 only. Table 1 illustrates composition of Paints 1 and 2 and Comparative Paint 1. In the table, RHOPLEX, TRITON, KATHON, and ACRYSOL are all Trademarks of The Dow Chemical Company or its Affiliates; MSPP refers to the multistage polymer particles as prepared in Example 1, and PGEE refers to the phenyl glycidyl ether ethoxylate block copolymer as prepared in Intermediate Example 1.

TABLE 1

Paint Example 1 Formulation

|  | Control | | Exp. 1 | | Exp. 2 | |
| --- | --- | --- | --- | --- | --- | --- |
|  | Lbs | Gal | Lbs | Gal | Lbs | Gal |
| RHOPLEX ™ HG-706 Binder | 523.8 | 59.2 | 510.0 | 57.6 | 500.6 | 56.5 |

TABLE 1-continued

Paint Example 1 Formulation

|  | Control | | Exp. 1 | | Exp. 2 | |
| --- | --- | --- | --- | --- | --- | --- |
|  | Lbs | Gal | Lbs | Gal | Lbs | Gal |
| BYK-024 Defoamer | 1.0 | 0.1 | 1.0 | 0.1 | 1.0 | 0.1 |
| Propylene Glycol | 4.3 | 0.5 | 4.3 | 0.5 | 4.3 | 0.5 |
| TRITON ™ X-100 Surfactant | 4.4 | 0.5 | 4.4 | 0.5 | 4.4 | 0.5 |
| Water | 10.0 | 1.2 | 9.9 | 1.2 | 9.9 | 1.2 |
| KATHON ™ LX 1.5% Biocide | 1.5 | 0.2 | 1.5 | 0.2 | 1.5 | 0.2 |
| TAMOL ™ 2002 Dispersant | 2.0 | 0.2 | 2.0 | 0.2 | 2.0 | 0.2 |
| Ammonia (28%) | 1.0 | 0.1 | 1.0 | 0.1 | 1.0 | 0.1 |
| Ti-Pure R-746 TiO$_2$ | 284.0 | 14.6 | 282.0 | 14.5 | 283.1 | 14.6 |
| Water | 58.2 | 7.0 |  |  |  |  |
| TEXANOL Coalescent | 7.9 | 1.0 | 7.8 | 1.0 | 7.8 | 1.0 |
| ACRYSOL ™ RM-2020E Rheology Modifier | 27.3 | 3.1 | 20.6 | 2.4 | 22.2 | 2.6 |
| ACRYSOL ™ RM-725 Rheology Modifier | 3.2 | 0.4 | 0.4 | 0.1 | 1.4 | 0.2 |
| BYK-024 Defoamer | 2.0 | 0.2 | 2.0 | 0.2 | 2.0 | 0.2 |
| MSPP (17% solids) |  |  | 182.3 | 21.4 | 183.0 | 21.5 |
| PGEE |  |  |  |  | 5.1 | 0.6 |
| Water | 97.4 | 11.7 |  |  |  |  |
| Totals | 1027.9 | 100.0 | 1029.2 | 100.0 | 1029.4 | 100.0 |

Table 2 shows the open time results for the three paints.

TABLE 2

Open Time for Paints

| Paint Ex. No. | Open Time Additive | Open Time (min) |
| --- | --- | --- |
| Paint 1 | 3% Ex 1 + 0.5% Int. Ex. 1 | 14.7 |
| Paint 2 | 3% Ex. 1 | 11.5 |
| Comp. 1 | NA | 7.0 |

The results show an improvement in open time when the multistage polymer particles are included in the paint formulation and a further improvement with the addition of a small amount of the PGEE. It has been further discovered that paint formulations that only contain the multistage polymer particles exhibit poorer leveling and lower gloss as compared with formulations that include an ancillary open time additive of the types described herein. Moreover, although PGEE alone can give an open time similar to that achieved by the combination of the multistage polymer particles and the PGEE, higher concentration of the PGEE are required, thereby adversely impacting water mark resistance, scrub resistance, and block resistance. The combination of the multistage polymer particles and the PGEE therefore give excellent open time without sacrificing other critical properties of the paint.

The invention claimed is:
1. A process for preparing an aqueous dispersion of neutralized multistage polymer particles comprising the steps of:
  1) contacting under emulsion polymerization conditions
    a) an aqueous dispersion of first polymer particles comprising from 25 to 65 weight percent structural units of a carboxylic acid monomer, and from 40 to 75 weight percent structural units of a nonionic monomer with b) first monomers comprising, based on the weight of the first monomers, i) from 80 to 99.5 weight percent styrene or methyl methacrylate or a combination thereof, and ii) from 0.5 to 20 weight percent of a carboxylic acid monomer; to form an aqueous dispersion of 2-stage polymer particles; then 2) contacting under emulsion polymerization conditions the aqueous dispersion of the 2-stage polymer particles with second monomers comprising, based on the weight of the second monomers a) from 1 to 60 weight percent methyl methacrylate, b) from 35 to 98.5 weight percent n-butyl acrylate, 2-ethylhexyl acrylate, ethyl acrylate, or n-butyl methacrylate, or a combination thereof; c) from 0.5 to 5 weight percent of a carboxylic acid monomer; and d) less than 20 weight percent styrene, to convert the 2-stage polymer particles to unneutralized 3-stage polymer particles; then 3) neutralizing the unneutralized aqueous dispersion of the 3-stage polymer particles with a base to form an aqueous dispersion of neutralized 3-stage polymer particles having an average particle size in the range of 150 nm to 400 nm;

wherein the weight-to-weight ratio of the first polymer particles to the first and second monomers is in the range of from 1:2 to 1:9; and the weight-to-weight ratio of the first monomers to second monomers is in the range of from 3:2 to 1:8;

wherein the first and second monomers form a shell having a calculated $T_g$ of less than 50° C.

2. The process of claim 1 wherein the first polymer particles comprise, based on the weight of the first polymer particles, from 30 to 50 weight percent structural units of a carboxylic acid monomer, and from 50 to 70 weight percent of a nonionic ethylenically unsaturated monomer; and further comprise less than 0.04 weight percent structural units of a multiethylenically unsaturated monomer.

3. The process of claim 2 wherein the first monomers comprise styrene or methyl methacrylate or a combination thereof, and from 0.5 to 20 weight percent of a carboxylic acid monomer; and the second monomers comprise from 35 to 60 weight percent methyl methacrylate; less than 20 weight percent styrene; and from 40 to 65 weight percent n-butyl acrylate, 2-ethylhexyl acrylate, ethyl acrylate, or n-butyl methacrylate, or a combination thereof.

4. The process of claim 3 wherein the second monomers further comprises a sulfur acid containing monomer or a salt thereof; and less than 10 weight percent styrene.

5. The process of claim 4 wherein the first monomers comprise from 0.5 to 20 weight percent of a carboxylic acid monomer and from 80 to 99.5 weight percent styrene; and the second monomers comprise from 50 to 60 weight percent n-butyl acrylate, 2-ethylhexyl acrylate, ethyl acrylate, or n-butyl methacrylate, or a combination thereof; from 35 to 50 weight percent methyl methacrylate; and less than 5 weight percent styrene; wherein the first and second monomers comprises less than 0.2 weight percent of a multiethylenically unsaturated monomer, based on weight of the first and second monomers.

6. The process of claim 1 wherein the process further includes the step of contacting the aqueous dispersion of neutralized 3-stage polymer particles with an ancillary additive which is a) a phenyl glycidyl ether represented by Structure I:

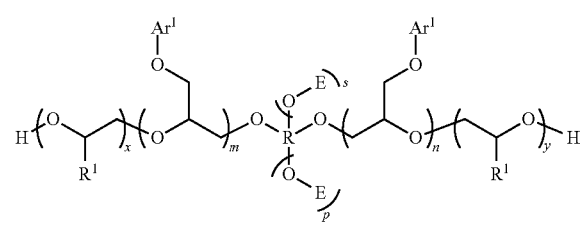

I where the fragment

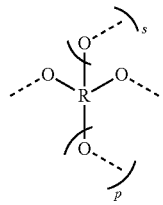

is a structural unit of a $C_2$-$C_{60}$ linear or a $C_3$-$C_{60}$ branched or cyclic diol, triol, or tetrol optionally functionalized with O atoms or aryl groups or both, or a structural unit of an unsubstituted aromatic diol, triol, or tetrol, or a structural unit of an aromatic diol, triol, or tetrol substituted with from 1 to 3 $C_1$-$C_6$ alkyl groups;

each $R^1$ is independently H or $C_1$-$C_6$ alkyl;

E is represented by the following structure:

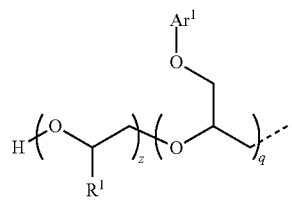

m, n, and q are each independently from 1 to 20; x, y, and z are each independently from 1 to 50;

p is 0 or 1; s is 0 or 1; and each $Ar^1$ is independently unsubstituted phenyl or naphthyl, or phenyl or naphthyl substituted with from 1 to 3 $C_1$-$C_6$ alkyl groups; or b) a phenyl glycidyl ether represented by the structure II:

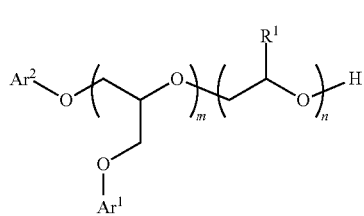

II where m is from 1 to 20; and n is from 1 to 100; or c) a secondary alcohol ethoxylate; or d) an ethoxylated sorbitan ester; or e) a polyoxyethylene alkyl phosphate; or f) an alkyne ethoxylate; or g) an ethylene oxide/propylene oxide polyol block copolymer.

7. The process of claim 6 wherein the ancillary additive represented by the phenyl glycidyl ether of Structure I is either of the following compounds:

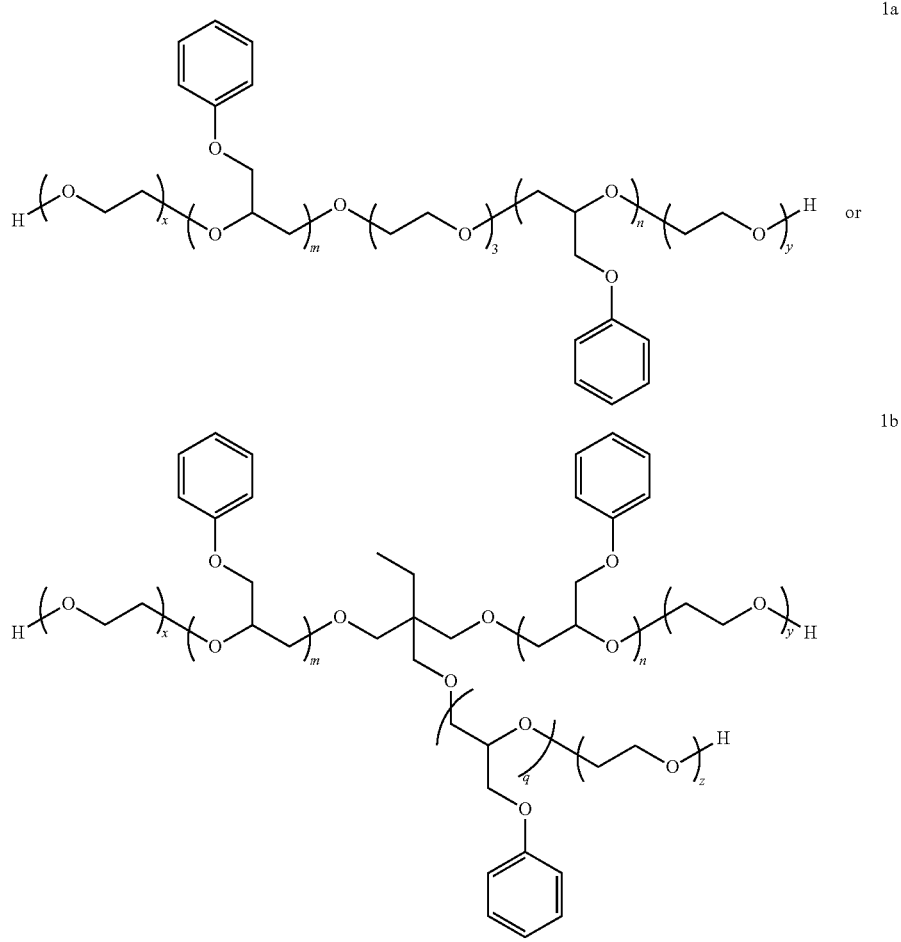

1a

1b wherein, for compound 1a, m+n is in the range of 2 to 8; and x+y is in the range of 25 to 50; and for compound 1b, m+n+q is in the range of from 4 to 8; and x+y+z is in the range of from 30 to 50.

8. The process of claim 1 wherein the process further includes the step of contacting the neutralized aqueous dispersion of the 3-stage polymer particles with one or more of a dispersant, a pigment, a defoamer, a surfactant, a solvent, an extender, a coalescent, a biocide, an opaque polymers, or a colorant.

9. The process of claim 7 wherein a mixture of the neutralized aqueous dispersion of the 3-stage polymer particles and the ancillary additive is blended with a binder, a defoamer, a surfactant, a biocide, a dispersant, $TiO_2$, a coalescent, and a rheology modifier to form a pigmented coating composition, wherein the dry weight concentration of the 3-stage polymer particles is in the range of 0.5 to 5 weight percent, and the concentration of the ancillary additive is in the range of from 0.1 to 1 weight percent, based on the weight of the composition, with the proviso that the concentration of the ancillary additive is less than 25 weight percent of the dry weight of the 3-stage polymer particles.

* * * * *